Aug. 9, 1949.   H. J. MAGINNISS   2,478,701
ELECTRIC MOTOR OPERATED ACTUATOR UNIT
Filed Feb. 24, 1947   3 Sheets-Sheet 1

INVENTOR.
Hamilton J. Maginniss.
BY
William J. Wesseler,
ATTORNEY.

Aug. 9, 1949.　　　　　H. J. MAGINNISS　　　　　2,478,701
ELECTRIC MOTOR OPERATED ACTUATOR UNIT
Filed Feb. 24, 1947　　　　　　　　　　　　3 Sheets-Sheet 2

INVENTOR.
Hamilton J. Maginniss.
BY
William J. Wesseler,
ATTORNEY.

Aug. 9, 1949. H. J. MAGINNISS 2,478,701
ELECTRIC MOTOR OPERATED ACTUATOR UNIT
Filed Feb. 24, 1947 3 Sheets-Sheet 3
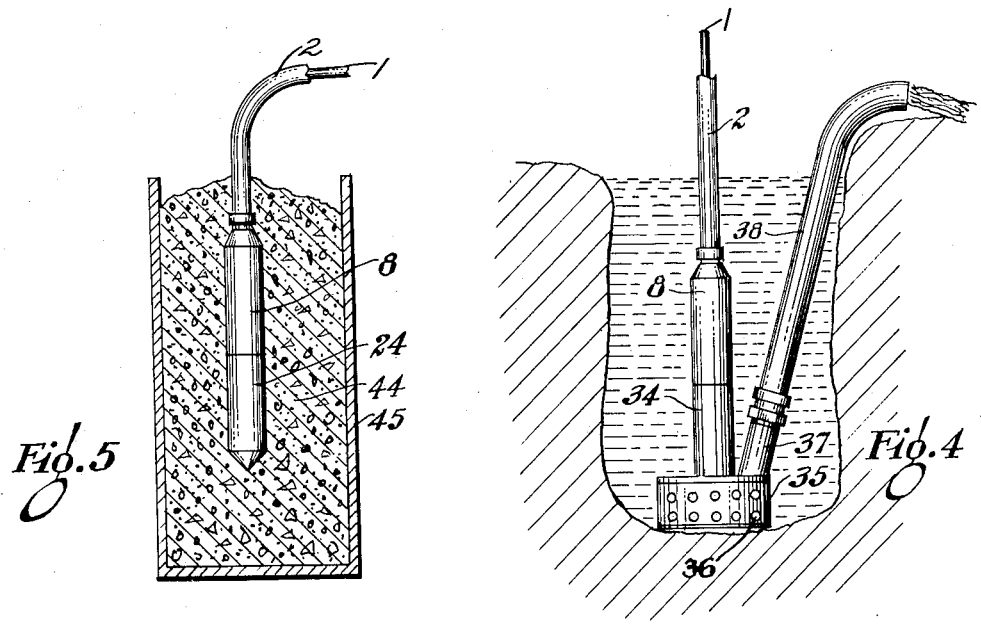
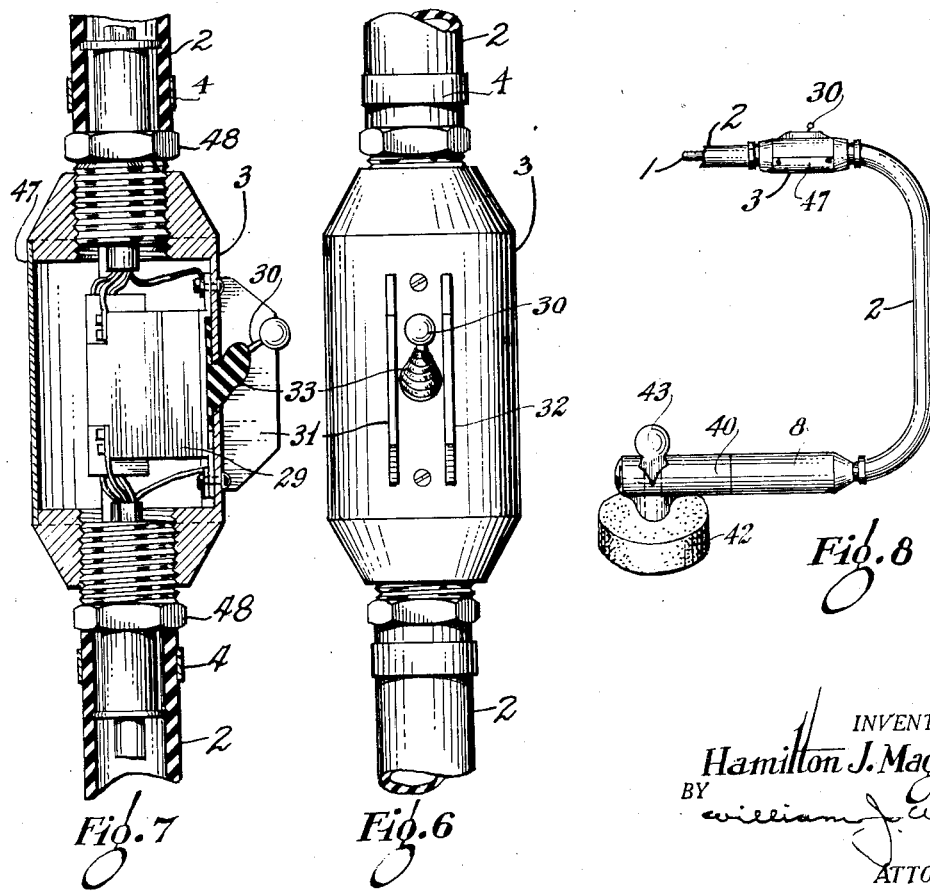
INVENTOR.
Hamilton J. Maginniss.
BY
William J. Wesseler,
ATTORNEY.

Patented Aug. 9, 1949

2,478,701

UNITED STATES PATENT OFFICE 2,478,701

ELECTRIC MOTOR OPERATED ACTUATOR UNIT

Hamilton J. Maginniss, Mansfield, Ohio

Application February 24, 1947, Serial No. 730,638

5 Claims. (Cl. 172—36)

This invention relates to submersible flexible self-contained electric power actuators for submersible accessories suitable for such operations as vibrating plastics, or concrete, in the treatment or laying thereof, and grinding, drilling or pumping, or the like.

One of the primary objects of the invention is to provide such a self-contained actuator that will include a manually operable switch and an electric motor and the necessary leads therebetween, all completely housed and waterproof and yet flexible to be manipulated manually with the greatest facility.

A more specific object is to provide the electric motor housing with a quick detachable means whereby, with the greatest facility, various types of work-producing accessories may be assembled on the motor housing to be a rigid continuation thereof and in driven connection with the motor shaft, and also readily disassemblable and interchangeable.

A further object is to insure a water-tight connection between the work-producing accessory and the motor housing and to also make such connection a rigid one to avoid use of resilient connections, which through wear and strain of use would lead to leakage.

A further object is to provide means whereby the electric leads are protected, not only against water in use, but also against undue wear and strain during the use of the assembly.

With the foregoing and other objects in view, the invention resides in the combination of parts and in the details of construction hereinafter set forth in the following specification and claims, certain embodiments of which are illustrated in the accompanying drawings, in which:

Figure 1 is an illustration of one use of which my invention may be put, namely, as an actuator for a vibrator for the treatment and laying of concrete, and shows the actuator mainly in elevation but partly broken away to show the cable and leads, and to show the connection of vibrator and motor housings and the mating connection between the motor shaft and the vibrator, which latter is also shown in elevation, partly broken away;

Figure 4 is a perspective view in elevation of the actuator connected to a work-producing accessory in the form of a pump and also illustrates its use as a means for pumping fluid out of a restricted space;

Figure 5 is a central similar view of the actuator applied to a concrete vibrator and the latter submerged in concrete, or the like;

Figure 6 is an enlarged view in elevation of the switch housing and cable housing connected thereto;

Figure 7 is a longitudinal sectional view taken through the assembly shown in Figure 6; and Figure 8 is a top view in elevation of the actuator applied to a grinding accessory.

Figure 1:
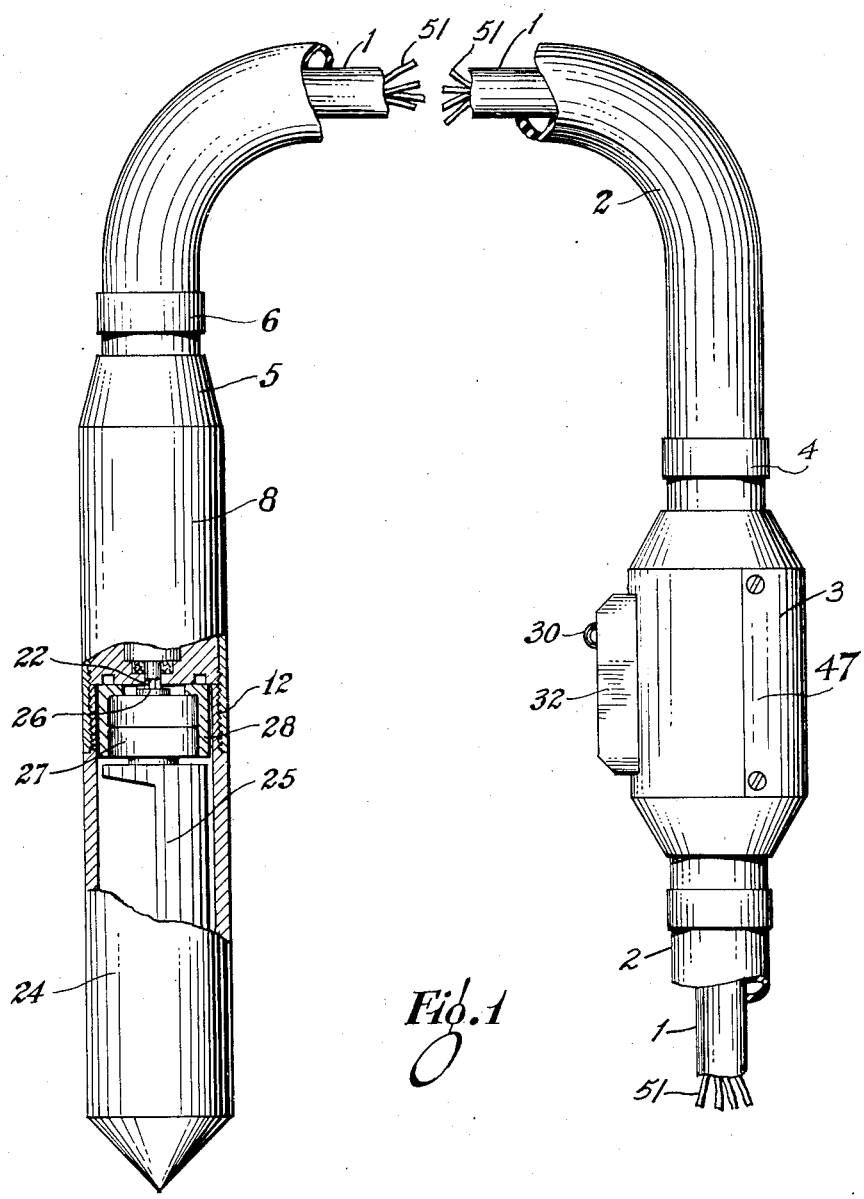

As is clearly shown in Figure 1 of the drawings, the self-contained flexible power and manipulating unit comprises a heavy-walled rubber housing 2 connected at one end with a switch housing 3 by means of a clamping band 4 and connected at its other end with a motor casing 5 by means of a clamping band 6. Intermediate the motor casing and the switch housing, the electric cable 1 containing leads 51 extend through housing extension 7 and through the rubber housing 2 and loosely into the motor casing without a packing gland, thus being fully protected from strain and abrasion, or any chance of a short circuit by the entrance of moisture within the structure.

Figure 2:
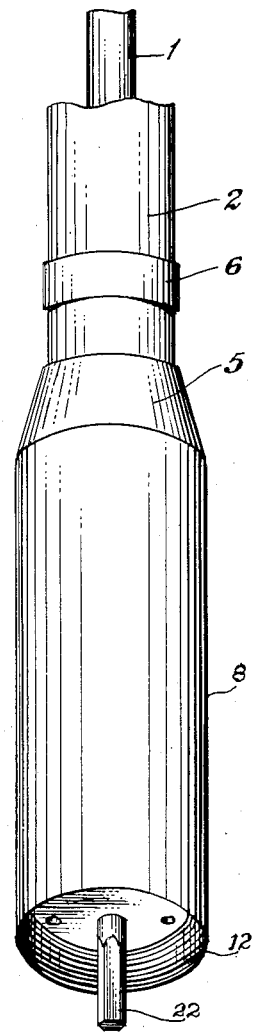
Figure 2 is a side view in perspective of the motor housing, showing the screw-thread connection for the work-producing accessory.
Figure 3:
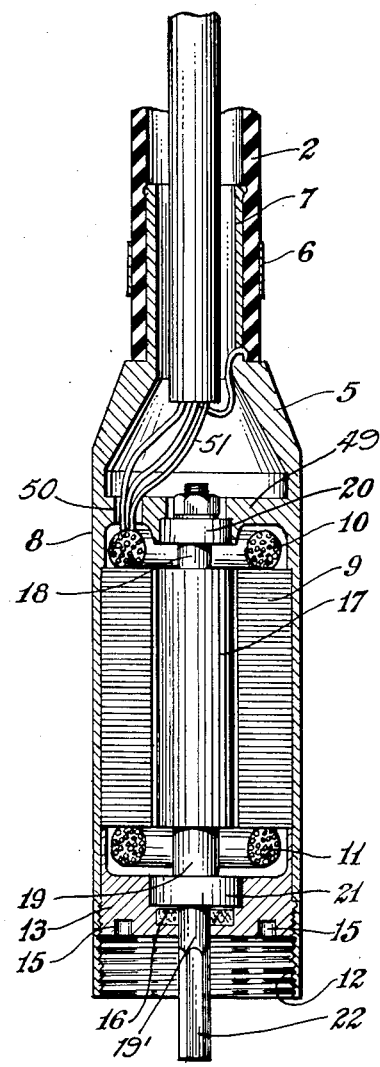
Figure 3 is a central view in longitudinal section taken through the motor and motor housing and also through a portion of the cable housing to show the connection of the leads to the motor.

As is clearly shown in Figures 2 and 3, the motor casing comprises a conical section 5 terminating in an elongated neck portion 7 to receive the rubber housing 2, which is held in place by the clamp 6. The motor casing also includes a cylindrical body member 8 within which the field coils 9 of the motor are housed, together with the coil ends 10 and 11. The lower end of the body member 8 is provided with internal threads 12 which receive a plug 13, screw-threaded to engage within the end portion of the body member. The plug 13 is provided with detents 15 to permit removal with a suitable wrench. The armature 17 is provided with stub shafts 18 and 19 received within ball bearings 20 and 21, respectively, engaged in suitable recesses formed in wall 49 of the motor casing and in plug 13, respectively. The plug 13 is provided with a shallow recess to receive suitable packing 16 adjacent the shaft 19. The shaft 19 has a reduced portion 19' that projects beyond the casing and is formed with a polygonal terminal 22 adapted to be connected with an operative unit such as may be supported by connection with the internal threads 12 of the cylindrical body member 8. Wall 49 has a large opening 50 through which leads 51 loosely pass to be connected to coil end 10.

Such operative unit may be a vibrator unit shown in Figure 1, in which the housing 24 is adapted to be screw-threadedly engaged with the internal threads 12 of the motor casing 8. The vibrator, or actuator, unit comprises an eccentric weight 25 adapted to be aligned with the armature of the motor and driven by the polygonal shaft terminal 22 of said motor, engaging a complementary recess in the extension shaft 26 provided on the eccentric weight. The eccentric weight is preferably mounted on ball bearings 27 so as to be adapted for rotation at high speed in order to produce suitable vibratory effect for use in compacting concrete and the like. The spacer 28 supports the ball bearings 27 in the vibrator housing 24.

As has been clearly indicated, the rubber housing is firmly secured to the upper end of the switch housing 3 which is a unit adapted to be carried over rough surfaces without injury, the ends thereof being suitably tapered and the body portion thereof being of adequate strength to withstand rough usage.

As is clearly shown in Figures 6 and 7, the switch comprises a contact member 29 adapted to be moved by means of lever 30, the lever operating between a pair of guard flanges 31 and 32, and having a conical sealing gasket 33 preventing the entrance of water into the interior of the switch housing through the slot in which the lever operates.

As has been indicated, the power actuator unit is adapted for use in various types of under-water operations and in addition to the provision of a vibrator attachment, the apparatus may be connected with a light-weight pump structure 34 such as is shown in Figure 4. Said pump structure has an enlarged base 35 with holes 36 providing an intake chamber and impeller housing, and has a central tubular enlargement 36 directly above the impeller within which the impeller shaft is contained, said tubular enlargement being provided on its upper end with external threads to engage in the corresponding internal threads provided in the lower portion of the motor casing 8. The water from the pump is discharged through an angularly disposed discharge port 37 with which a flexible discharge conduit 38 is connected in order to carry the point of discharge to a place some distance from the point of pump operation to prevent the return flow of water which has just been removed.

In place of connecting the vibrator attachment or the pump attachment to the end of the motor casing, a grinding wheel unit such as is shown in Figure 8 may be applied by screwing the end portion of said unit casing 40 into the screw-threaded lower portion of the motor casing heretofore described. The grinding attachment comprises the cylindrical casing 40 within which is a shaft suitably arranged to connect with the polygonal end of the motor shaft and having at its opposite end suitable means for driving a transverse shaft 41 to which the grinding wheel 42 is attached. A suitable handle or knob 43 is provided for moving the grinding wheel to a suitable point of operation.

It will be understood that in place of a grinding wheel, a saw or a drill may be connected to carry on under-water operations of such character should the same be required.

In Figure 5 the power and manipulating unit 1 is shown with a vibrator attachment 24 in place, the unit being positioned centrally within a semi-plastic mass of concrete 44, held within a form 45. The concrete is subjected to vibration for the purpose of compacting the same. It will be noted that the vibrator attachment has a conical shaped lower end portion 46 which facilitates its moving downward progressively through the semi-plastic mass.

Other attachments than those described may also be used, since the apparatus is readily portable and may be placed in position for under-water operations with the greatest of ease. All the connections are made water-tight by suitable means and the switch is so constructed that it may readily be taken apart for inspection and repair through a bottom plate 47 on the switch housing which gives free access to the entire inside area of the switch.

Other means of applying the principle of my invention may be employed instead of those explained, change being made as regards the means and the steps herein disclosed, provided those stated by any one of the following claims or their equivalents be employed or embodied therein.

I therefore particularly point out and distinctly claim as my invention:

1. In combination in a self-contained electric motor operated actuator having an electric motor and motor driving shaft, a switch, an electric cable extending between said motor and switch and to a power source, co-extensive waterproof housings for said motor, switch and cable and waterproof connections between the housings for said cable and those for said switch and motor and a work-producing accessory having a driven member and a housing and a single releasable means for connecting its housing and driven member to said motor housing and motor driving shaft respectively.

2. In combination in a self-contained electric motor operated actuator having an electric motor and motor driving shaft, a switch, an electric cable extending between said motor and switch and to a power source, co-extensive waterproof housings for said motor, switch and cable and waterproof connections between the housings for said cable and those for said switch and motor and a work-producing accessory having a driven member and a housing and a single releasable rigid non-resilient means for connecting its housing and driven member to said motor housing and motor driving shaft respectively.

3. In combination in a self-contained electric motor operated actuator having an electric motor and motor driving shaft, a switch, an electric cable extending between said motor and switch and to a power source, co-extensive waterproof housings for said motor, switch and cable and waterproof connections between the housings for said cable and those for said switch and motor and a work-producing accessory having a driven member and a housing and a single rigid releasable screw-thread means for connecting its housing and driven member to said motor housing and motor driving shaft respectively.

4. In combination in a self-contained electric motor operated actuator having an electric motor and motor driving shaft, a switch, an electric cable extending between said motor and switch and to a power source, co-extensive waterproof housings for said motor, switch and cable and waterproof connections between the housings for said cable and those for said switch and motor and a work-producing accessory having a driven member and a housing, a single releasable rigid screw-thread means for connecting its housing and driven member to said motor housing and motor driving shaft respectively, the housings for said accessory and motor at their point of juncture being co-extensive and of substantially equal outer dimensions.

5. In combination in a self-contained electric motor operated actuator having an electric motor and motor driving shaft, a switch, an electric cable extending between said motor and switch and to a power source, co-extensive waterproof housings for said motor, switch and cable and waterproof connections between the housings for said cable and those for said switch and motor and a work-producing accessory having a driven member and a housing and a single releasable means for connecting its housing and driven member to said motor housing and motor driving shaft respectively and means in said motor housing for loosely receiving said cable.

HAMILTON J. MAGINNISS.

REFERENCES CITED

The following references are of record in the file of this patent:

UNITED STATES PATENTS

| Number | Name | Date |
| --- | --- | --- |
| 508,380 | Gardner | Nov. 7, 1893 |
| 992,009 | McLang | May 9, 1911 |
| 1,622,166 | Schultz | Mar. 22, 1927 |
| 1,764,388 | Buchet | June 17, 1930 |
| 2,059,239 | Jackson | Nov. 3, 1936 |
| 2,066,740 | Ripsch | Jan. 5, 1937 |
| 2,116,708 | Niekamp | May 10, 1938 |
| 2,217,746 | Hawley | Oct. 15, 1940 |
| 2,277,264 | Youhouse | Mar. 24, 1942 |
| 2,278,365 | Daniels | Mar. 31, 1942 |
| 2,278,624 | Parker et al. | Apr. 7, 1942 |
| 2,320,708 | Yost | June 1, 1943 |
| 2,345,757 | Lester | Apr. 4, 1944 |
| 2,350,817 | Purves et al. | June 6, 1944 |